US010352618B2

(12) United States Patent
Tabke et al.

(10) Patent No.: US 10,352,618 B2
(45) Date of Patent: Jul. 16, 2019

(54) METHOD FOR DRYING A GAS CHAMBER AND ARRANGEMENT COMPRISING A PROTECTIVE GAS-FILLED CHAMBER

(71) Applicant: WIKA Alexander Wiegand SE & Co. KG, Klingenberg (DE)

(72) Inventors: Thorsten Tabke, Wesel (DE); Thomas Saewe, Menden (DE)

(73) Assignee: WIKA Alexander Wiegand SE & Co. KG, Klingenberg (DE)

(*) Notice: Subject to any disclaimer, the term of this patent is extended or adjusted under 35 U.S.C. 154(b) by 132 days.

(21) Appl. No.: 15/566,674

(22) PCT Filed: Apr. 6, 2016

(86) PCT No.: PCT/EP2016/057531
§ 371 (c)(1),
(2) Date: Oct. 13, 2017

(87) PCT Pub. No.: WO2016/165996
PCT Pub. Date: Oct. 20, 2016

(65) Prior Publication Data
US 2018/0087839 A1 Mar. 29, 2018

(30) Foreign Application Priority Data

Apr. 15, 2015 (DE) .......................... 10 2015 206 744

(51) Int. Cl.
*H01B 3/56* (2006.01)
*H02B 13/055* (2006.01)
(Continued)

(52) U.S. Cl.
CPC .......... *F26B 21/145* (2013.01); *B01D 53/261* (2013.01); *F26B 3/04* (2013.01);
(Continued)

(58) Field of Classification Search
CPC ...... B01D 53/04; B01D 53/261; B01D 53/06; F26B 3/04; F26B 21/14; F26B 21/145; H01B 3/56; H01H 33/562; H02B 13/055
(Continued)

(56) References Cited

U.S. PATENT DOCUMENTS 2,505,581 A * 4/1950 Unger ..................... H01F 27/14
174/14 R
2,853,540 A * 9/1958 Camilli ................... H01F 27/20
174/16.1
(Continued)

FOREIGN PATENT DOCUMENTS

CN 203928605 U 11/2014
DE 102011053288 A1 3/2013
UA 106430 C2 8/2014

OTHER PUBLICATIONS

European Patent Office, International Search Report for PCT/EP2016/057531, dated Jul. 8, 2016.
(Continued)

*Primary Examiner* — Frank M Lawrence, Jr.
(74) *Attorney, Agent, or Firm* — Ice Miller LLP

(57) ABSTRACT

The invention relates to a method for drying a chamber comprising a predominantly protective-gas atmosphere in the chamber under positive pressure, which has an operating pressure p1 and a predetermined minimum pressure $p_{min}$, wherein the minimum pressure $p_{min}$ of the gas chamber is monitored and the operating pressure p1 is greater than the minimum pressure $p_{min}$, wherein the method comprises the following steps: a) removing of a partial quantity Vi of the protective gas from the chamber, wherein the partial quantity Vi is equivalent to the pressure differential Δp, which is smaller or equal to the differential between p1 and $p_{min}$, b) introducing a partial quantity V2 of a dry or dried protective gas into the gas chamber up to a gas pressure p2, which is
(Continued)

Figure 1:
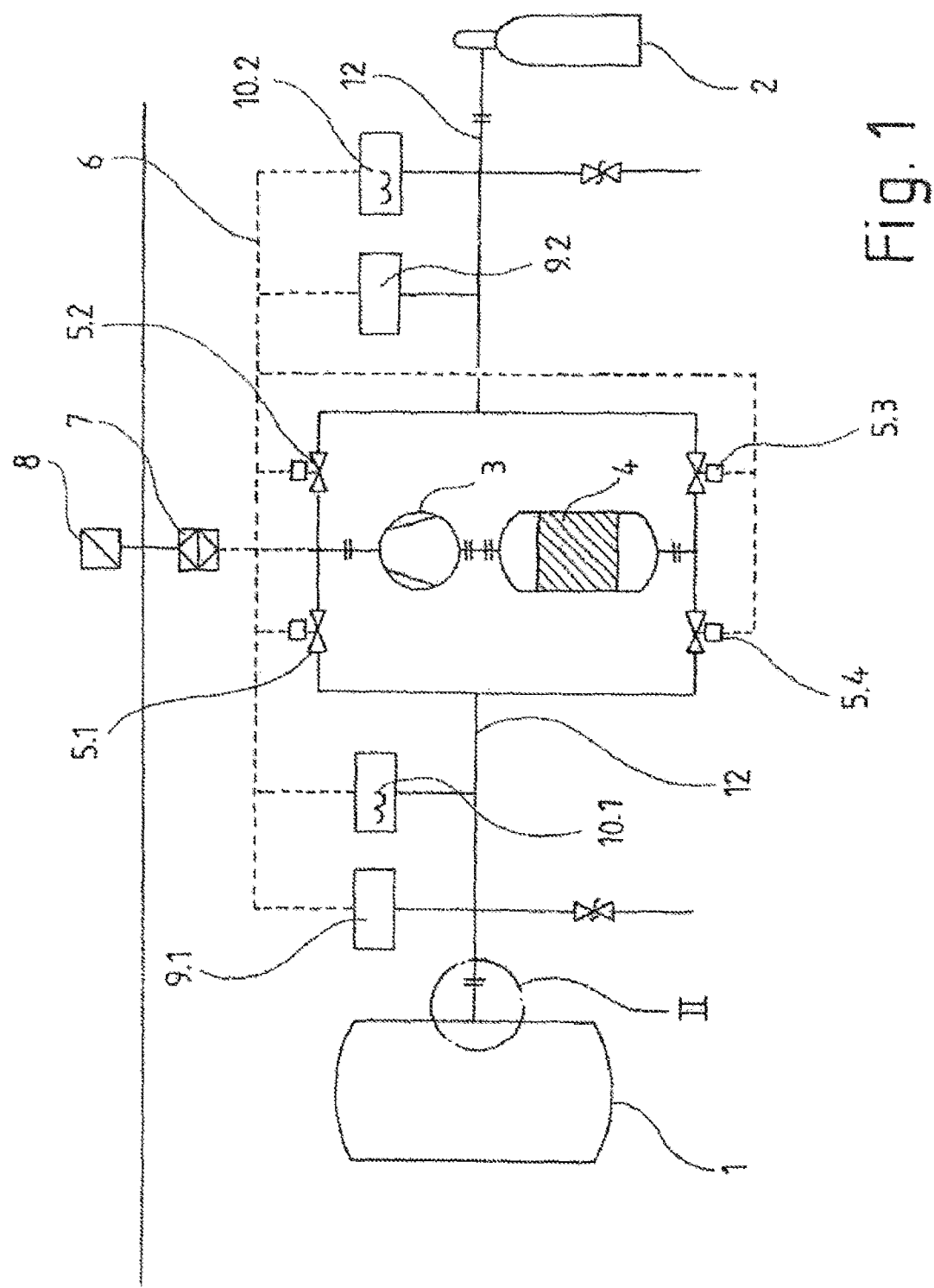

greater than $p_{min}$ and c) repeating method steps a) and b) after a predetermined waiting time $\Delta t$. The invention further relates to an arrangement for carrying out the method.

12 Claims, 2 Drawing Sheets

(51) Int. Cl.
    *F26B 21/14*     (2006.01)
    *F26B 3/04*     (2006.01)
    *B01D 53/26*     (2006.01)
    *H01H 33/56*     (2006.01)

(52) U.S. Cl.
    CPC ............... *F26B 21/14* (2013.01); *H01B 3/56* (2013.01); *H01H 33/562* (2013.01); *H02B 13/055* (2013.01)

(58) Field of Classification Search
    USPC ................... 95/90; 96/108; 34/80, 472, 473; 55/385.4
    See application file for complete search history.

(56) References Cited

U.S. PATENT DOCUMENTS

| | | | | |
|---|---|---|---|---|
| 4,278,832 A * | 7/1981 | Hingorani | ............ | H02B 13/055 |
| | | | | 174/14 R |
| 6,004,377 A * | 12/1999 | Tamata | ................ | B01D 53/685 |
| | | | | 95/119 |
| 6,389,845 B1 * | 5/2002 | Li | ......................... | B01D 53/002 |
| | | | | 62/617 |
| 6,966,934 B1 * | 11/2005 | Sato | ..................... | B01D 53/002 |
| | | | | 210/640 |
| 2004/0045432 A1 * | 3/2004 | Yamamoto | ............ | B01D 53/22 |
| | | | | 95/48 |

OTHER PUBLICATIONS

European Patent Office, Written Opinion of the International Searching Authority for PCT/EP2016/057531, dated Jul. 8, 2016.

* cited by examiner

METHOD FOR DRYING A GAS CHAMBER AND ARRANGEMENT COMPRISING A PROTECTIVE GAS-FILLED CHAMBER

CROSS REFERENCE TO RELATED APPLICATION

The present application is a U.S. national stage of, and claims the priority benefit of, International Patent Application Serial No. PCT/EP2016/057531, filed Apr. 6, 2016 and also claims the priority benefit of German Patent Application Serial No. 10 2015 206 744.0, filed Apr. 15, 2015, the text and drawings of which are hereby incorporated by reference in their entireties.

The invention relates to a method for drying a gas space, comprising a predominantly protective gas atmosphere in the chamber under a positive pressure.

The invention additionally relates to an arrangement comprising at least one gas space filled with a protective gas.

A gas space in the sense of the present invention may be, for example, a gas-insulated high voltage electrical equipment or a container for such equipment. High voltage electrical equipment in the sense of the present invention includes, for example, electric power switches and measuring transducers. Such electrical equipment is often filled with an insulating and quenching gas as the protective gas. For example, $SF_6$ (sulfur hexafluoride) is considered to be a quenching gas. Contact separation in a power switch initially results in an electric arc between the contacts arranged in a switchgear terminal box filled with insulating gas, for example. The insulating gas in the switchgear boxes is enclosed under a predetermined minimum pressure and causes a resulting electric arc to be quenched.

Insulating gas-filled housings of electrical equipment are usually designed as pressurized containers, which must meet certain requirements regarding imperviousness.

Reliable functioning of the electrical equipment depends on the purity of the protective gas and/or the $SF_6$ gas in particular. The imperviousness of the gas space is usually monitored by pressure monitors and/or density monitors.

Depending on the type of electrical equipment, a gas space for accommodating electrical equipment may be operated at a rated excess pressure of approximately 6 to 8 bar, for example.

The term "rated excess pressure" in the sense of the present invention is understood to refer to the operating pressure for which the gas space is designed. The actual operating pressure of the gas space may be higher than the rated excess pressure but may also be lower than the rated excess pressure.

The term "excess pressure" or "positive pressure" in the sense of the present invention is understood to refer to a pressure above atmospheric pressure, in other words, a pressure above 1.013 mbar.

Even if the operating pressure of the gas space is many times greater than atmospheric pressure, it is usually impossible to prevent moisture in the form of water vapor due to diffusion from penetrating into the gas space due to the construction. Water vapor penetrating into the gas space reduces the purity of the protective gas and therefore its electrical properties (permittivity), and this is a fundamentally unwanted condition.

Fundamentally, the moisture content of the protective gas should be so low that the pressure dew point of the protective gas does not exceed −5° C.

It is therefore fundamentally known that gas spaces having a protective gas atmosphere for holding electrical equipment should be furnished with agents for adsorption of moisture. These adsorbers are usually made of aluminum oxide or filled with molecular sieves, for example, in the form of zeolites, which are disposed in areas of the gas space having a low electrical field strength. Such "filters" for absorbing moisture have a limited capacity. When they must be replaced, it is first necessary to stop operation of the equipment. Older electrical equipment filled with protective gas is not furnished with such filter systems, and it is complicated and expensive to subsequently retrofit such electrical equipment.

The object of the invention is therefore to provide a method for drying a gas space with a predominantly protective gas atmosphere under a positive pressure, which can be used during operation of the electrical equipment and with which retrofitting or structural changes in the equipment are avoided. This method should be usable in particular over the lifetime of the equipment.

The invention is also based on the object of providing a corresponding arrangement on electrical equipment and/or a corresponding arrangement, comprising at least one protective gas-filled gas space.

This object is achieved with the features of claim 1. Advantageous embodiments of the invention are derived from the dependent claims.

This object is additionally achieved by the other independent process claims.

According to one aspect of the invention, a method for drying a gas space, having a protective gas atmosphere prevailing under an excess pressure in the gas space, is provided, with an operating pressure p1 and a predetermined minimum pressure $p_{min}$, wherein the minimum pressure $p_{min}$ of the gas space is monitored, and the operating pressure p1 is greater than the minimum pressure $p_{min}$, wherein this method comprises the following steps:

a) Removing a partial amount V1 of the protective gas from the gas space, wherein the partial amount V1 is equivalent to a pressure difference Δp which is less than or equal to the difference between p1 and $p_{min}$, b) Introducing a partial amount V2 of a dry or dried protective gas into the gas space up to a gas pressure p2 which is greater than $p_{min}$ and c) Repeating the method steps a) and b) after a predetermined waiting time Δt.

The invention is based on the finding that the moisture in the gas space is distributed to the gas phase inside the protective gas and to the solid parts of the equipment arranged in the gas space as well as the encompassing walls of the gas space. If a moisture equilibrium is achieved between the solid parts of the gas space, its built-in parts and the protective gas, then the predominant portion of the total moisture content will be in or on the solids. This portion of the moisture content does not have a direct effect on the reliability of the functioning of the system.

However, since a large portion of the moisture content is not present in the gas phase, then basically complete replacement of the protective gas is not helpful because a significant portion of the moisture content remains inside the gas space.

Method steps a) and b) may be carried out simultaneously or in succession. Method steps a) through c) are preferably carried out in the order of their enumeration.

According to the invention, the invention makes use of a differential pressure between a pressure that is to be maintained and the minimum pressure $p_{min}$ inside the gas space and a rated pressure of the gas space or an actual operating pressure p1 of the gas space in order to change the moisture equilibrium prevailing in the gas space in favor of drying out the solids. To do so, so-called "breathing" of the gas space in the area of a reliable pressure difference between the minimum pressure $p_{min}$ and the actual operating pressure p1 is utilized according to the invention.

It is thus provided according to the invention that a partial amount of the protective gas inside the gas space is to be replaced cyclically, so that the vapor pressure gradient between the water and the protective gas is increased each time, and a portion of the water goes from the liquid phase into the gas phase. Removing a partial amount V1 of protective gas from the gas space may take place as an equivalent to a pressure different Δp between p1 (operating pressure) and $p_{min}$ (minimum pressure), but this pressure difference must not be utilized to the full extent.

Therefore, in a first method step, a partial amount V1 of moist protective gas is first removed from the gas space and, to replace it, a partial amount V2 of a dry or dried protective gas is introduced into the gas space. After a certain period of time, a new moisture equilibrium is established within the gas space, with a portion of the water being transferred from the liquid phase to the gas phase.

This period of time is described according to the invention by the predetermined waiting time Δt. After a waiting time, a partial amount of protective gas is then again removed from the gas space, and a partial amount of a dry or dried protective gas is introduced into the gas space, namely up to a gas pressure p2, which is greater than the gas pressure $p_{min}$. The additional steps of the method provide for removing partial amounts V1+n of moist gas and introducing partial amounts V2+n of a dry or dried protective gas into the gas space cyclically.

This procedure can be controlled completely by pressure, i.e., as a function of the pressure difference prevailing between the minimum pressure $p_{min}$ and the operating pressure p1. The waiting times can be fixedly predetermined. Alternatively the waiting times may be ascertained as a function of a measurement of the moisture content of the gas removed.

In one variant of the method, it is provided that the moisture of the filling quantity V1 of protective gas removed is measured and the method steps a) through c) are repeated until the moisture content of the protective gas removed has dropped below a predetermined level.

The partial amount V1 is expediently of such a size that the differential pressure Δp amounts to approximately the difference between the operating pressure p1 and the minimum pressure pain of the gas space.

It is fundamentally possible to provide for the gas space that is to be dried to be overfilled to a technically acceptable extent, i.e., for the operating pressure p1 of the gas space to be higher than the rated pressure of the gas space.

The partial amount V1 of protective gas removed is expediently dried by means of at least one drying filter outside of the gas space and then stored in another gas space.

A container for an item of electrical equipment or, in the broadest sense, an item of electrical equipment per se, is expediently provided as the gas space to be monitored and is filled with a quenching gas as the protective gas. For example, the protective gas provided may be $SF_6$ (sulfur hexafluoride).

Alternatively or additionally, it is possible to provide that the partial amount V1 is stored in a storage container, from which the partial amount V2 is also removed.

Fundamentally, the method may be carried out with a plurality of gas spaces, between which gas volumes V1+n are exchanged.

In the simplest case, the method is carried out with a gas space that is to be monitored and a gas source in the form of a storage container.

As already mentioned, the partial amount V1, after being dried, can be fed into another gas space, which is designed as a container for an item of electrical equipment or as the electrical equipment itself.

According to another aspect of the invention, it relates to an arrangement, comprising a first and a second gas space filled with a protective gas, a line system connecting the first and second gas spaces, at least one compressor arranged in the line system, at least one drying unit arranged in the line system, means for detecting the gas pressure inside the line system, valves controllable, preferably electrically, so that the compressor can convey gas from the first gas space into the second gas space and can convey gas from the second gas space into the first gas space, means for controlling the compressor as a function of the pressure inside the line system or inside the gas spaces as well as means for controlling the valves as a function of the desired direction of conveyance of the gas. For example, a piston compressor may be provided as the compressor, conveying gas from the second gas space into the first gas space and optionally conveying gas from the first gas space into the second gas space. A moisture filter is expediently connected upstream from the compressor. For example, the filter may be designed as a filter packing with granules that absorb moisture.

This arrangement is expediently designed for carrying out the method described above.

The valves inside the line system are expediently controllable and arranged in such a way that a bidirectional conveyance of the gas between two gas spaces is possible by means of a single compressor, at least one of the gas spaces accommodating a unit of electrical equipment or being designed as such electrical equipment itself. As already explained above, both the first and second gas spaces can accommodate a unit of electrical equipment or be designed as such. Alternatively, the second gas space, for example, or an additional gas space may be designed as a storage container for the protective gas.

It is fundamentally possible to provide that the line system is connected by a single connection to the gas spaces. Existing electrical equipment with a protective gas atmosphere will usually have only one gas filling and removal connection.

If the volume inside the gas space, which is available for gas exchange, is relatively small, in the case of bidirectional conveyance of gas from one gas space into the other and back again under some circumstances, there may be a back-and-forth conveyance of moist gas into and out of a gas space without any exchange of gas in fact taking place. To ensure reliable operation of the arrangement, even in the case of relatively small gas spaces, it is possible to provide that the line system comprises at least one ring line segment, to which at least one of the gas spaces is connected directly.

The invention will now be explained in greater detail below on the basis of one embodiment that is illustrated in the drawings.

Figure 2:
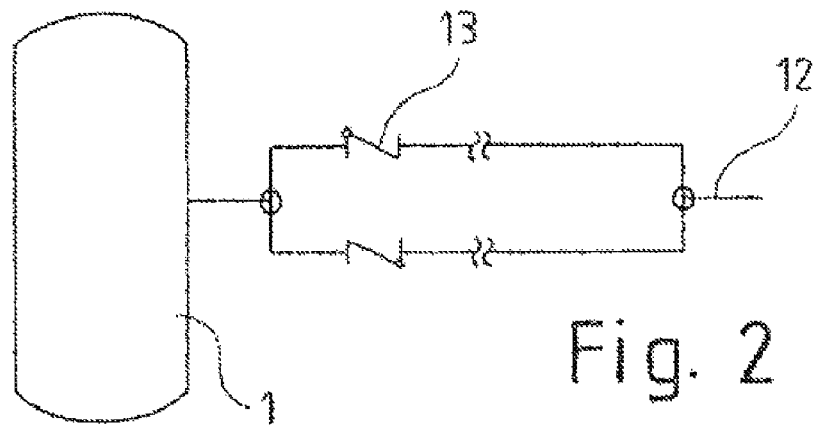
Figure 3:
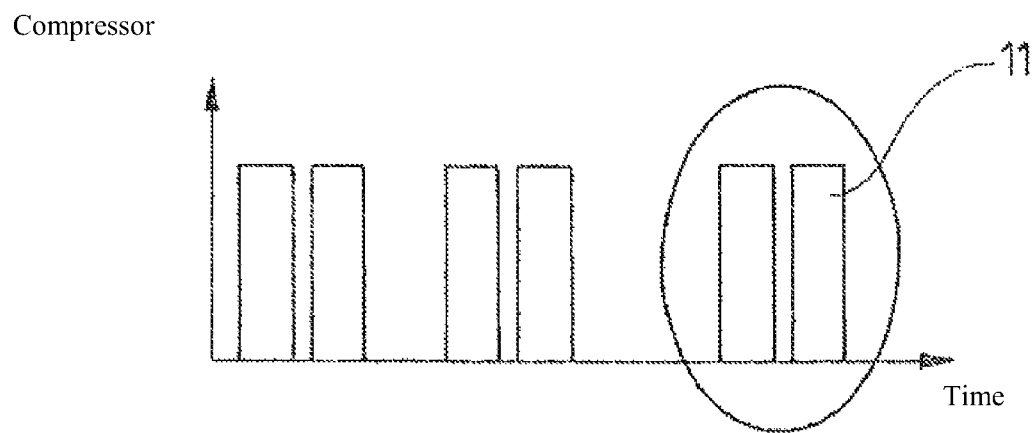

The drawings show:

FIG. 1 a schematic diagram of an arrangement for drying a protective gas-filled gas space, FIG. 2 a variant of the connection of the gas line 12 to the first gas space, FIG. 3 a diagram illustrating the mode of operation of the compressor in the method according to the invention.

The method according to the invention is described below with reference to an exemplary embodiment in which a first gas space 1 is designed as a container for a unit of electrical equipment and a second gas space 2 is designed as a gas storage container (gas bottle). The first gas space 1 and the second gas space 2 are connected to one another by a gas line 12. A compressor 3 and a filter 4 are connected to the gas line 12 in such a way that bidirectional operation of the compressor 3 is possible. Therefore the compressor 3 is arranged in a type of hydraulic/pneumatic bridge circuit which can be operated by means of a total of four electrically controllable valves 5.1, 5.2, 5.3 and 5.4. The valves 5.1, 5.2, 5.3 and 5.4 are connected by a control line 6 to a control unit 7 which can be operated in turn by means of an operating unit 8. The control unit 7 also communicates with pressure pickups 9.1 and 9.2 and moisture sensors 10.1 and 10.2 in the control line 6.

The method according to the invention will now be explained below with reference to the arrangement according to FIG. 1.

As already mentioned, the first gas space 1 is designed as a unit of electrical equipment with $SF_6$ filling as the protective gas.

In the example described here, the first gas space 1 has a gas volume of approximately 150 liters and a rated excess pressure of 6 bar. The operating pressure p1 inside the first gas space 1 may amount to 0.3 to 0.5 bar above the rated excess pressure, for example. Assuming that the minimum pressure $p_{min}$ amounts to approximately the rated excess pressure of 6 bar, then 0.3 bar to 0.5 bar would be available as a pressure difference for the purpose of "breathing" of the first gas space 1. Basically, the minimum pressure $p_{min}$ may be lower than the rated excess pressure, although that is not assumed here for the sake of simplicity.

In a first method step, a partial volume of protective gas V1 is removed from the first gas space 1 and sent to the second gas space 2 through the filter 4 by way of the compressor 3. In doing so, the partial amount V1 thereby removed is dried by means of the filter 4, and this partial amount V1 is fed into the second gas space 2. During the process, the valve 5.1 is closed, the valve 5.4 is open, valve 5.2 is open and valve 5.3 is closed. All valves 5.1, 5.2, 5.3 and 5.4 are closed when currentless. In other words, valves 5.1, 5.2, 5.3 and 5.4 are designed as solenoid valves, for example, which open when current flows through them accordingly.

When the partial amount V1 is removed from the first gas space 1, the compressor 3 is operated until the Δp available for removal of the protective gas has been consumed. The pressure prevailing in the first gas space 2 is detected by means of the pressure pickup 9.1. If the pressure difference available for removal of protective gas has been used up, then reversal of the valve 5.1, 5.2, 5.3 and 5.4 is induced by the control unit 7. The valves 5.1 and 5.3 are opened, but valves 5.2 and 5.4 are closed. The compressor 3 conveys a partial amount V2 of the protective gas out of the second gas space 2, through the filter 4 and into the first gas space 1 until a pressure p2 has been reached inside the first gas space 1. The partial amount V1 of protective gas thus removed and the partial amount V2 replacing it are conveyed through the filter 4. The pressure p2 is greater than the predetermined minimum pressure $p_{min}$. If the minimum pressure $p_{min}$ should correspond to the rated pressure, then the pressure p2 is greater than the rated pressure of the first gas space 1.

The compressor is operated until a pressure difference allowing the removal of a sufficiently large partial amount V1+n out of the first gas space 1. Then a waiting time is observed until a corresponding moisture equilibrium has been established in the first gas space 1. The vapor pressure gradient between water and protective gas is increased because of the supply of a partial amount V2 of dried protective gas. After a while, an equilibrium is established again. Then a partial amount V1+n of protective gas is again removed from the first gas space 1 and a partial amount V2 of the dried protective gas from the second gas space 2 is introduced into the first gas space 1. These method steps are repeated until the pressure dew point inside the first gas space 1 has been reduced to a predetermined temperature. The pressure dew point is determined by means of the moisture measurement using moisture sensors 10.1 and 10.2. The pressure dew point is a measure of the moisture in the gas phase prevailing in the gas space 1.

FIG. 2 shows an enlarged detail of one variant of a connection of the gas line to the first gas space 1, which is designed as a ring line with two non-return valves 13. The non-return valves 13 permit unidirectional transport of the gas (circulation), wherein the ring line is provided to enlarge the gas volume/dead volume of the first gas space.

FIG. 3 shows the number of operating cycles of the compressor 3 over time, the first bar showing the drying cycle from the first gas space 1 to the second gas space 2 and the second bar showing the drying cycle from the second gas space 2 to the first gas space 1, and the distance between the second and third bars on the time axis illustrating the predetermined waiting time Δt.

LIST OF REFERENCE NUMERALS

1 First gas space
2 Second gas space
3 Compressor
4 Filter
5.1, 5.2, 5.3, 5.4 Valves
6 Control line
7 Control unit
8 Operating unit
9.1, 9.2 Pressure pickup
10.1, 10.2 Moisture sensors
12 Gas line
13 Non-return valves

The invention claimed is:

1. A method for drying a gas space with a protective gas atmosphere prevailing in the gas space under a positive pressure with an operating pressure p1 and a predetermined minimum pressure $p_{min}$, wherein the predetermined minimum pressure $p_{min}$ of the gas space is monitored and the operating pressure p1 is greater than the minimum pressure $p_{min}$, wherein the method comprises the following steps:
   a. Removing a partial amount V1 of the protective gas from the gas space, wherein the partial amount V1 is equivalent to a pressure difference Δp which is less than or equal to the difference between p1 and $p_{min}$;
   b. Introducing a partial amount V2 of a dry or dried protective gas into the gas space up to a gas pressure p2 which is greater than $p_{min}$ and
   c. Repeating method steps a) and b) after a predetermined waiting time Δt.

2. The method according to claim 1, characterized in that the moisture content of the partial amount V1 of the protective gas removed is measured, and the method steps a) through c) are repeated until the moisture content of the protective gas thereby removed has fallen below a predetermined level.

3. The method according to claim 1, characterized in that the partial amount V1 is of such a size that the differential pressure $\Delta p$ amounts approximately to the difference between the operating pressure p1 and the minimum pressure $p_{min}$ of the gas space.

4. The method according to claim 1, characterized in that the operating pressure p1 of the gas space is greater than or equal to the rated pressure of the gas space.

5. The method according to claim 1, characterized in that the partial amount V1 removed is dried by means of at least one drying filter and then is stored in another gas space.

6. The method according to claim 1, characterized in that a container for electrical equipment or such electrical equipment per se is provided as the gas space to be monitored, which is filled with a quenching gas as the protective gas.

7. The method according to claim 6, characterized in that the partial amount V1 is stored in a storage container out of which the partial amount V2 is preferably removed.

8. The method according to claim 6, characterized in that the partial amount V2 is fed into another gas space, which is designed as a container for electrical equipment or as such electrical equipment per se.

9. An arrangement comprising a first and a second gas space (1, 2) filled with a protective gas, a line system (12) connecting the first and the second gas spaces (1, 2), at least one compressor (3) arranged in the line system (12), at least one gas drying unit (4) arranged in the line system (12), means for detecting the gas pressure inside the line system (12), valves (5.1, 5.2, 5.3, 5.4), which can be controlled in such a way that the compressor (3) can alternately convey gas from the first gas space (1) into the second gas space (2) and can convey gas from the second gas space (2) into the first gas space (1), means for controlling the compressor as a function of the pressure inside the line system (12) and means for controlling the valves (5.1, 5.2, 5.3, 5.4) as a function of the desired direction of conveyance of the gas.

10. The arrangement according to claim 9, characterized in that the first gas space (1) accommodates electrical equipment or is designed as electrical equipment.

11. The arrangement according to claim 9, characterized in that the second gas space (2) is designed as a storage container for the protective gas.

12. The arrangement according to claim 9, characterized in that the second gas space (2) accommodates electrical equipment or is designed as electrical equipment.

\* \* \* \* \*

UNITED STATES PATENT AND TRADEMARK OFFICE
CERTIFICATE OF CORRECTION

Page 1 of 1

PATENT NO. : 10,352,618 B2
APPLICATION NO. : 15/566674
DATED : July 16, 2019
INVENTOR(S) : Thorsten Tabke et al.

It is certified that error appears in the above-identified patent and that said Letters Patent is hereby corrected as shown below:

On the Title Page

At Item (73), in the Assignee name, please delete "WIKA Alexander Weigand SE & Co. KG" and insert --WIKA Alexander Wiegand SE & Co. KG--

Signed and Sealed this
Ninth Day of June, 2020

Andrei Iancu
*Director of the United States Patent and Trademark Office*